US007942000B2

(12) United States Patent
Crate

(10) Patent No.: US 7,942,000 B2
(45) Date of Patent: May 17, 2011

(54) ROTARY VANE ENGINE SYSTEM

(75) Inventor: Barry T. Crate, Sutton West (CA)

(73) Assignee: Engine-Uity Limited, Sutton West (CA)

( * ) Notice: Subject to any disclaimer, the term of this patent is extended or adjusted under 35 U.S.C. 154(b) by 691 days.

(21) Appl. No.: 11/860,881

(22) Filed: Sep. 25, 2007

(65) Prior Publication Data

US 2009/0077964 A1 Mar. 26, 2009

(51) Int. Cl.
F02G 3/00 (2006.01)
F02G 5/02 (2006.01)
F01K 15/00 (2006.01)
F02B 53/04 (2006.01)
F02B 53/00 (2006.01)
F01C 1/00 (2006.01)
F01C 1/30 (2006.01)
F01C 21/04 (2006.01)
B60H 3/00 (2006.01)
F28D 7/02 (2006.01)

(52) U.S. Cl. ............... 60/616; 60/597; 60/668; 123/243; 123/236; 418/13; 418/89; 418/33; 165/42; 165/164

(58) Field of Classification Search ............... 60/616, 60/597; 123/243, 236; 418/13, 93, 89, 33; 165/144, 164, 42, 80.4
See application file for complete search history.

(56) References Cited

U.S. PATENT DOCUMENTS

| 2,090,214 A | | 3/1935 | Maniscalco | 60/616 |
|---|---|---|---|---|
| 2,248,484 A | * | 7/1941 | Bancroft | 60/616 |
| 2,262,003 A | * | 11/1941 | Huffman et al. | 165/144 |
| 2,455,297 A | * | 11/1948 | Curtis et al. | 418/93 |
| 3,072,320 A | * | 1/1963 | Cox et al. | 418/13 |
| 3,306,353 A | * | 2/1967 | Burne | 165/164 |
| 3,447,596 A | * | 6/1969 | Hughes | 165/42 |
| 3,812,828 A | * | 5/1974 | Griffiths | 418/89 |
| 3,971,346 A | * | 7/1976 | McReynolds | 123/236 |
| 3,986,575 A | | 10/1976 | Eggman | 60/616 |

(Continued)

FOREIGN PATENT DOCUMENTS

JP 01211684 A * 8/1989

OTHER PUBLICATIONS

International Search Report for International Application No. PCT/CA2008/001516 dated Nov. 3, 2008.

(Continued)

*Primary Examiner* — Thai Ba Trieu
(74) *Attorney, Agent, or Firm* — Calfee, Halter & Griswold LLP

(57) ABSTRACT

A rotary vane engine system for using exhaust heat energy of a fuel-based heat engine. The heat engine includes a crankshaft being driven by a combustion cycle, and the heat engine generates exhaust gases by combustion. The system comprises an independent air system, wherein the independent air system contains air separate to the exhaust gases. A heat exchanger system is provided for transferring exhaust heat energy from the exhaust gases to the air contained in the independent air system to generate pressurized air. A rotary vane engine is also provided having a housing, a rotor contained within the housing and coupled to the crankshaft of the heat engine, and a plurality of vanes extending radially from the rotor. The pressurized air is expanded within the rotary vane engine for rotation of the rotor thereby providing drive to the crankshaft of the heat engine.

20 Claims, 9 Drawing Sheets

U.S. PATENT DOCUMENTS

| | | | | |
|---|---|---|---|---|
| 4,009,573 A | * | 3/1977 | Satz | 418/13 |
| 4,204,815 A | * | 5/1980 | Le Blanc | 418/13 |
| 4,230,075 A | | 10/1980 | Lowther | 123/68 |
| 4,232,654 A | | 11/1980 | Gary | 165/179 |
| 4,241,713 A | * | 12/1980 | Crutchfield | 123/243 |
| 4,333,424 A | | 6/1982 | McFee | 123/68 |
| 4,380,971 A | * | 4/1983 | Tholen et al. | 60/597 |
| 4,476,821 A | | 10/1984 | Robinson et al. | 123/68 |
| 4,590,767 A | | 5/1986 | Gardner | 60/668 |
| 4,702,205 A | | 10/1987 | David | 60/595 |
| 5,181,490 A | * | 1/1993 | Ruzic | 123/243 |
| 5,857,436 A | | 1/1999 | Chen | 123/68 |
| 6,006,519 A | * | 12/1999 | Hormell, Jr. | 60/407 |
| 6,134,876 A | | 10/2000 | Hines et al. | |
| 6,162,034 A | | 12/2000 | Mallen | 418/265 |
| 6,550,442 B2 | * | 4/2003 | Garcia | 123/243 |
| 2002/0029571 A1 | | 3/2002 | Gray | 60/616 |
| 2003/0010327 A1 | | 1/2003 | Hankins | |
| 2003/0121494 A1 | | 7/2003 | Yosikane | 123/243 |
| 2003/0147761 A1 | * | 8/2003 | Sakita | 418/33 |
| 2003/0226525 A1 | | 12/2003 | Warren | 123/65 R |
| 2006/0112913 A1 | | 6/2006 | Warren | 123/68 |
| 2006/0157225 A1 | * | 7/2006 | Martin et al. | 165/80.4 |

OTHER PUBLICATIONS

Written Opinion for International Application No. PCT/CA2008/001516 dated Nov. 3, 2008.

International Preliminary Examination Report on Patentability for International Application Serial No. PCT/CA2008/001516, dated Mar. 30, 2010.

* cited by examiner

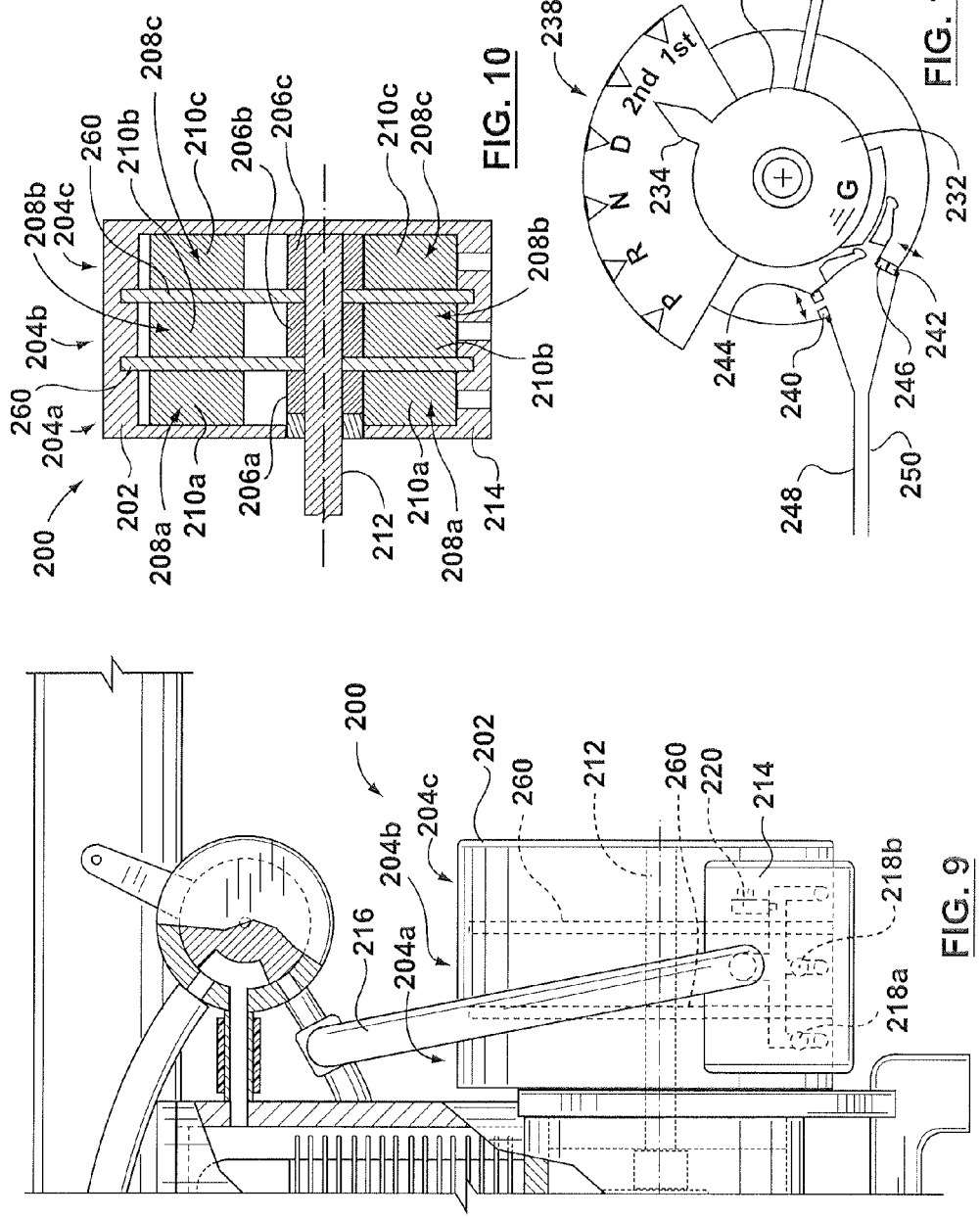

ROTARY VANE ENGINE SYSTEM

FIELD OF THE INVENTION

This invention relates to rotary engines, and in particular to rotary vane engines for use with heat engines.

BACKGROUND OF THE INVENTION

Heat engines are commonly found in today's cars, trucks, boats and industrial equipment. A difficulty with conventional heat engines is that heat energy generated from the combustion process in heat engines may be wasted; much of the heat energy remains in the exhaust gases.

Rotary vane engines may generally be used to convert moving air into useable power. Conventional rotary vane engines include a number of vanes radially extending from a central rotor. As air is circulated through a rotary vane engine, the vanes are effected by the air and therefore turn the central rotor, which may be used for generating power and the like.

Some rotary vane engine systems have been used in combination or in conjunction with fuel-based heat engines. In such systems, the rotary vane engine is part of the main engine, and would for example require fuel injection and subsequent combustion to occur between the vanes inside the rotary vane engine. As the fuel is combusted, the vanes are effected by air expansion to rotate the central rotor to generate the desired power. In such systems, since fuel is combusted, the exhaust gases must be released from the rotary vane engine as the gases are no longer "clean".

BRIEF DESCRIPTION OF THE DRAWINGS

Embodiments will now be described by way of example with reference to the accompanying drawings, in which like reference numerals are used to indicate similar features.

FIG. 9 shows a partial front elevation view of yet another example embodiment of a rotary vane engine;

FIG. 10 shows a cross-sectional view of the rotary vane engine in FIG. 9, similar to the view taken along section lines 8A-8A in FIG. 1; and FIG. 11 shows a detail front view of a gear shift system to be used with the rotary vane engine of FIG. 9.

SUMMARY

It would be advantageous to provide systems and methods for re-using of the heat energy contained in the exhaust gases of heat engines.

The present application provides a rotary vane engine system. The system generally provides an independent air system, heatable by the exhaust of a heat engine and containing air separate to the exhaust gases of the heat engine, whereupon a heating of the air in the independent air system increases the pressure of the air contained therein for driving of a rotary vane engine, and wherein the rotary vane engine is coupled to the same heat engine.

In one example embodiment, there is provided a rotary vane engine system for using exhaust heat energy of a fuel-based heat engine. The heat engine includes a crankshaft being driven by a combustion cycle, and the heat engine generates exhaust gases by combustion. The system comprises an independent air system, wherein the independent air system contains air separate to the exhaust gases. A heat exchanger system is provided for transferring exhaust heat energy from the exhaust gases to the air contained in the independent air system to generate pressurized air. A rotary vane engine is also provided having a housing, a rotor contained within the housing and coupled to the crankshaft of the heat engine, and a plurality of vanes extending radially from the rotor. The pressurized air is expanded within the rotary vane engine for rotation of the rotor thereby providing drive to the crankshaft of the heat engine.

In another example embodiment, there is provided a method of using exhaust heat energy of a fuel-based heat engine. The heat engine includes a crankshaft being driven by a combustion cycle, and the heat engine generates exhaust gases by combustion. The method includes providing an independent air system, wherein the independent air system contains an air stream separate to the exhaust gases, bringing the air stream of the independent air system into thermal contact with the exhaust gases, thereby transferring heat energy from the exhaust gases to the air stream in the independent air system to generate a pressurized air stream, providing a rotary vane engine in communication with the independent air system, the rotary vane engine having a housing, a rotor contained within the housing and coupled to the crankshaft of the heat engine and a plurality of vanes extending radially from the rotor, expanding the pressurized air stream within the rotary vane engine to effect a rotation of the rotor, and driving the crankshaft of the heat engine by the rotation of the rotor.

DETAILED DESCRIPTION

Figure 1:
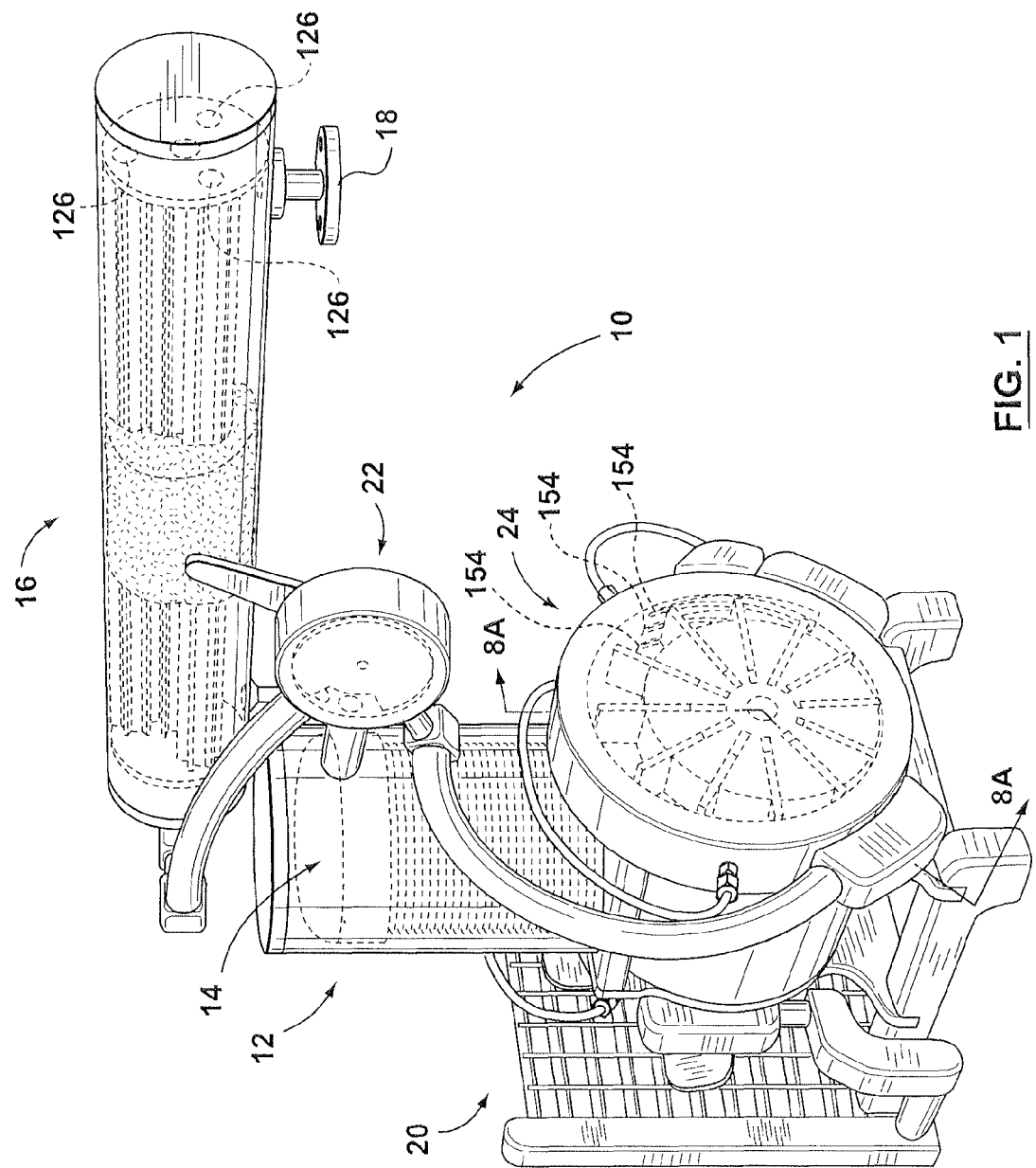
FIG. 1 shows a perspective view of a rotary vane engine system in accordance with an example embodiment.

Reference is now made to FIG. 1, which shows an example embodiment of a rotary vane engine system 10. The rotary vane engine system 10 includes a main engine system 12 which includes a conventional heat engine 14. Exhaust gases produced by combustion in the heat engine 14 flow through a heat exchanger system 16 and thereafter exit the system 10 through an exhaust outlet 18. The exhaust gases produced are typically of a substantially high temperature. The remainder of the rotary vane engine system 10 can be generally described as an enclosed (closed loop) independent compressed air system (hereinafter the "closed loop"), which contains air separate from the exhaust gases of the heat engine 14. The closed loop of the rotary vane engine system 10 consists of an air path that flows through a compressor system 20, a portion of the main engine system 12, a throttle system 22, the heat exchanger system 16, and a rotary vane engine 24. Generally, the compressor system 20 cools and further compresses air contained in the closed loop, resulting in cooled and compressed air. The main engine system 12 then receives the cooled and compressed air, which is used to cool the heat engine 14, and at the same time results in heating of the air. The air exiting from the main engine system 12 may be considered partially-heated air. The throttle system 22 may be used to direct the partially-heated air to either the heat exchanger system 16 or to the rotary vane engine 24, depending on the particular mode of operation. When the throttle system 22 directs the partially-heated air to the heat exchanger system 16, this represents an active mode of operation. In the heat exchanger system 16, the partially-heated air is further heated by way of heat transfer from the high temperature exhaust gases which are fed directly into the heat exchanger system 16 from the combustion chambers of the heat engine 14. Therefore, as the partially-heated air flows through the heat exchanger system 16 it becomes high temperature and high pressure, or "highly charged" air. This "highly charged" air may then flow to the rotary vane engine 24. The rotary vane engine 24 receives the highly charged air which provides a driving force for rotating of the rotary vane engine 24. The rotary vane engine 24 is coupled to the heat engine 14 in the main engine system 12, thereby providing additional drive to the heat engine 14. The air from the rotary vane engine 24 is then directed back to the compressor system 20, thereby completing the closed loop.

Figure 2:
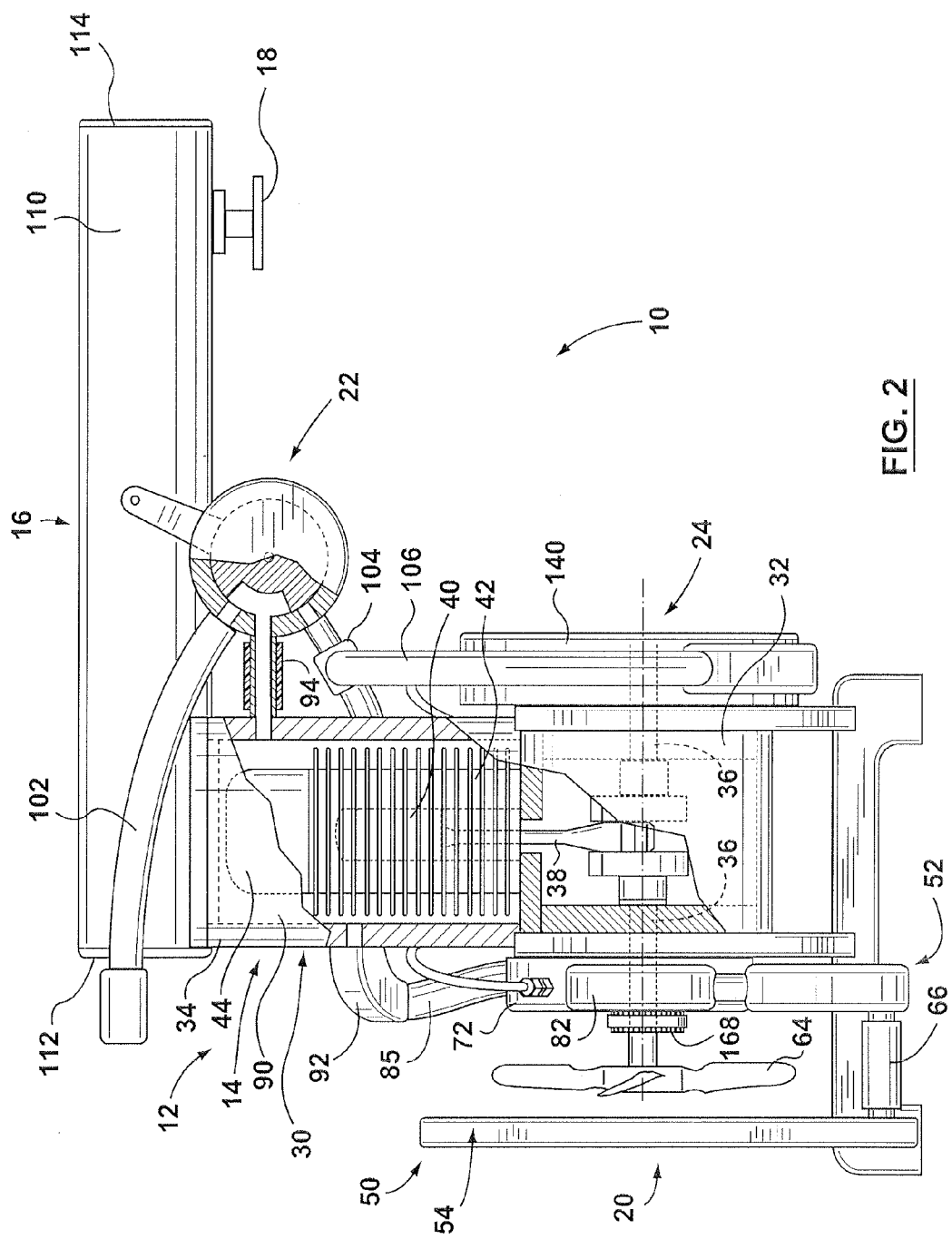
FIG. 2 shows a front elevation view of the rotary vane engine system of FIG. 1.

The heat engine 14 in the main engine system 12 will now be described in greater detail. Reference is now made to FIG. 2, which shows a front elevation view of the rotary vane engine system 10. The heat engine 14 includes an engine housing 30 comprising a main engine block 32 and a pressure pot 34 located above the main engine block 32. A crankshaft 36 is contained within the main engine block 32. A connecting rod 38 is used for connecting the crankshaft 36 to a piston 40. The piston 40 resides within a finned cylinder 42 inside of the pressure pot 34. A valve cover 44 is used to cover the valves (not shown) used for operation of the heat engine 14, i.e., for fuel injection and release of exhaust gases upon combustion within the piston 40 and finned cylinder 42. An exhaust pipe 46 (FIG. 5) is used for directing exhaust gases from the heat engine 14 to the heat exchanger system 16. The exhaust gases may then exit the rotary vane engine system 10 by way of the exhaust outlet 18 of the heat exchanger system 16. Fuel ignition and valve action of the heat engine 14 are not shown for simplicity of illustration, as any suitable valve system can be used. As can be appreciated, although only a single piston/cylinder 40, 42 arrangement is shown, the heat engine 14 may instead have multiple cylinders, and may also be a two or four stroke engine, etc. It can also be appreciated that a number of types of conventional heat engines may be suitable for use with the rotary vane engine system 10 described herein.

Figure 3:
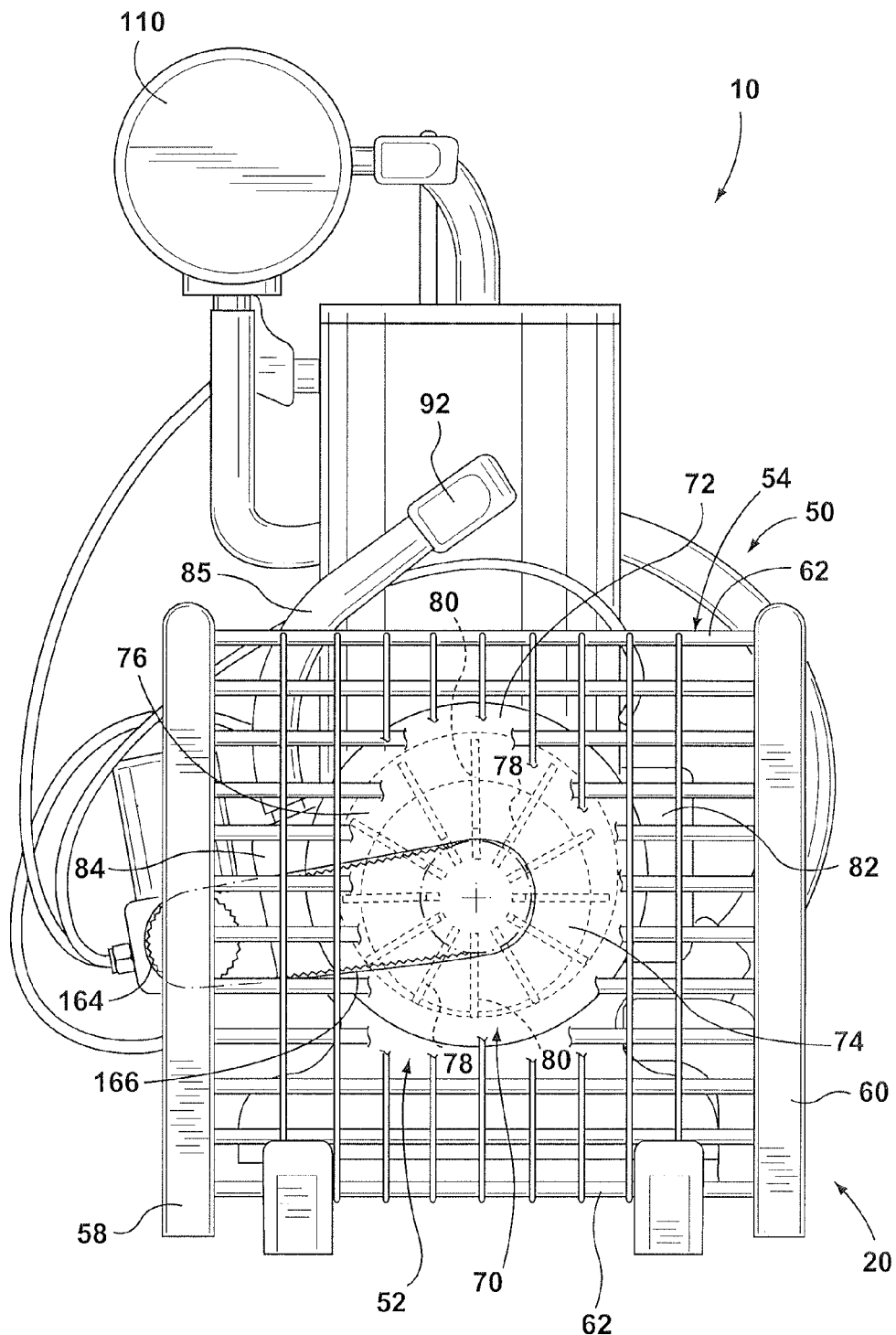
FIG. 3 shows a left elevation view of the rotary vane engine system of FIG. 1.
Figure 6:
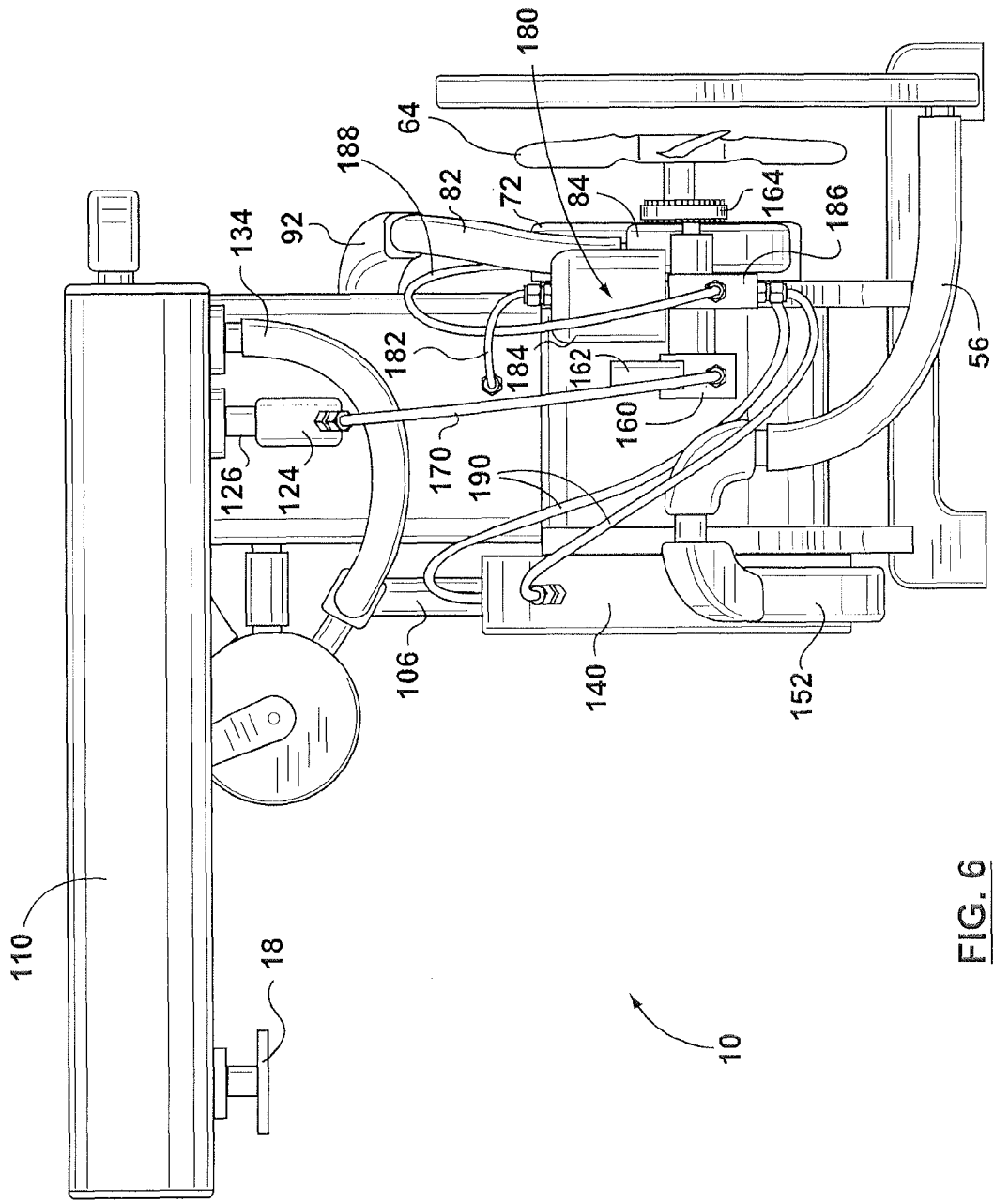
FIG. 6 shows a rear elevation view of the rotary vane engine system of FIG. 1.

The independent closed loop air system will now be described in further detail. Reference is now made to FIG. 3, which shows the compressor system 20 of the closed loop air system. The compressor system 20 includes a cooling component 50 and a compressor component 52. In the subject embodiment, the cooling component is in the form of a heat exchanger 54. The heat exchanger 54 has an inlet manifold 58 and an outlet manifold 60 with horizontal, spaced apart horizontal tubes 62 extending therebetween. Air enters the inlet manifold 58 from hose 56 (FIG. 6) and flows through tubes 62 to the outlet manifold 60. Air exits the outlet manifold 60 through exit hose 66. Cooling fan 64 (FIG. 2) draws generally cool atmospheric air transversely across tubes 62 to cool the air flowing though tubes 62. The air exiting the outlet manifold 60, therefore, may be considered cooled air. In the embodiment shown, cooling fan 64 is operably coupled to the crankshaft 36 of the heat engine 14 (FIG. 2), although the cooling fan 64 could instead be powered independently. It can be appreciated that other means of cooling the air may be used, for example using another form of two-fluid heat exchanger which uses a cooling medium other than atmospheric air. For instance, a heat exchanger using a liquid coolant such as water or ethylene glycol could be used.

Referring still to FIG. 3, the compressor component 52 of the compressor system 20 is shown as a vane compressor 70, which may for example be a reciprocating vane compressor. The vane compressor 70 includes a compressor housing 72 having a generally circular cross-section. A rotor 74 is eccentrically mounted within the compressor housing 72, for example on a lower portion or region of the housing 72 (as shown). A face plate 76 encloses the vane compressor 70 within the compressor housing 72. The rotor 74 may also be operably coupled to the crankshaft 36 (FIG. 2) of the heat engine 14 (FIG. 2), however, the rotor 74 may also be independently operated by any suitable driving force. The rotor 74 includes a number of spaced-apart slots 78 disposed at regular intervals around the circumference of the rotor 74. A plurality of vanes 80 are also shown, one in each slot 78 of the rotor 74, wherein the vanes 80 are slideable within each slot 78. The vanes 80 are, therefore, reciprocating. More specifically, the vanes 80 are radially slideable within each respective slot 78 while in operation. Since the rotor 74 is eccentrically mounted in the lower portion of the compressor housing 72, the vanes 80 on the lower portion are disposed radially inward, while the vanes 80 on an upper portion or region of the housing 72 are extended radially outward. As shown, the vanes 80 on the lower portion are forced radially inward by bearing against an inner surface of the housing 72. However, as the vanes 80 rotate away from the lower part of the housing 72, the vanes 80 are urged radially outwards by centripetal force while in operation. Upon rotation of the rotor 74, the volume of air contained between vanes 80 becomes larger when the vanes 80 are extended radially outward (at the upper portion as shown) and becomes gradually smaller as the vanes 80 retract radially inward (at the lower portion as shown). The appropriate placement of an inlet and outlet to the compressor housing 72 would thus cause appropriate air compression, as desired, through rotation of the rotor 74 in the vane compressor 70. As shown, the compressor component 50 further includes a compressor intake manifold 82 which receives cooled air from the outlet manifold 60 of the cooling component 50. A compressor outlet manifold 84 acts as the output for exiting air from the compressor housing. Both manifolds 82, 84 are located on the compressor housing 72 at a suitable location on the circumference of the housing 72 to ensure that the air compresses upon rotation of the rotor 74, for example upon counter-clockwise rotation of the rotor 74 in the example shown in FIG. 3. It is also noted that rotation of the rotor 74 assists to circulate the air through the closed loop. At this point, the air may be considered cooled and compressed air. The cooled and compressed air exits the outlet manifold 84 of the vane compressor 70 by means of a compressor hose 85.

A next stage of the closed loop will now be described, referring again to FIG. 2, and to the main engine system 12. As shown, the pressure pot 34 houses the finned cylinder 42 and an air space or pressure chamber 90 is defined between the outer surface of the finned cylinder and the inner surface of the pressure pot 34. This pressure chamber 90 forms part of the air flow circuit of the closed loop. An input elbow 92 receives the cooled and compressed air from the compressor hose 85 of the compressor system 20. In the pressure chamber 90, the cooled and compressed air remains exterior of the finned cylinder 42 and valve cover 44, and does not mix with the combustible gases contained therein. The cooled and compressed air circulated within the pressure chamber 90 cools the heat engine 14, thereby gaining heat from the heat engine 14. At this stage, the air may be considered to be partially-heated air. The partially heated air exits the pressure chamber 90 via a throttle intake hose 94, which directs the partially heated air into the throttle system 22.

Figure 4A:
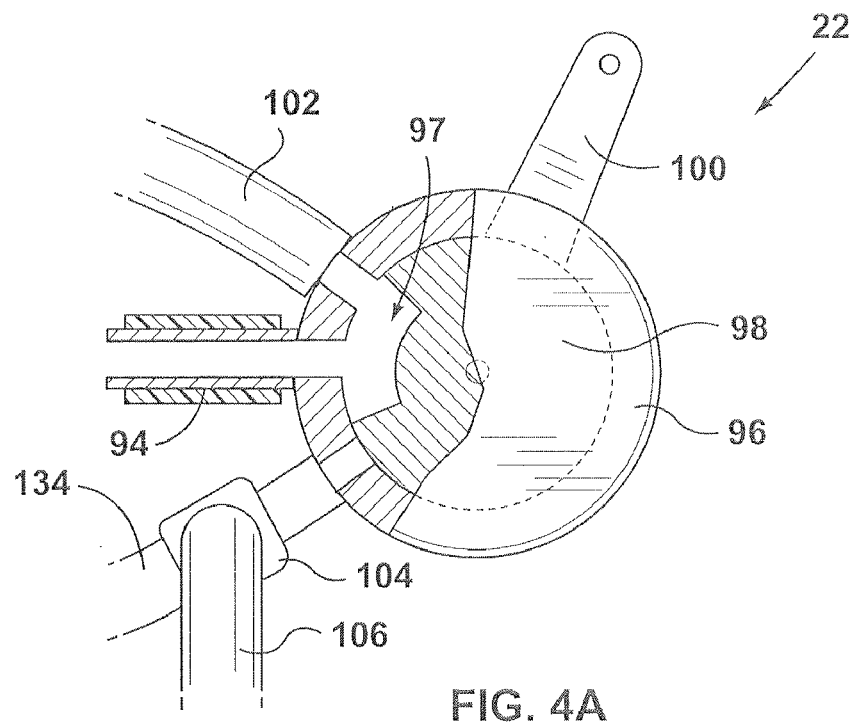
FIG. 4A shows a detail front view of a throttle system to be used in the rotary vane engine system of FIG. 1 in a first mode of operation.
Figure 4B:
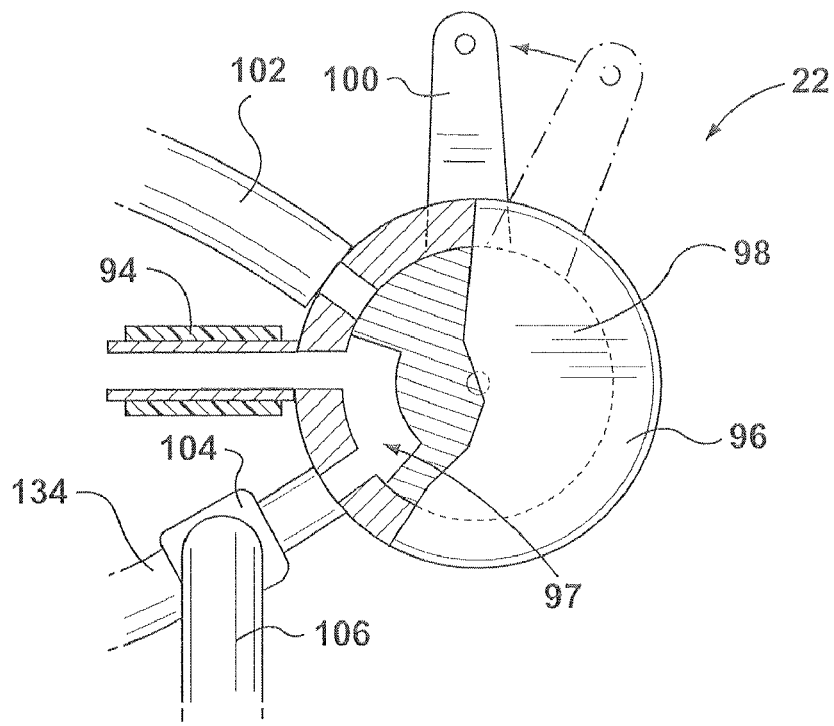
FIG. 4B shows the throttle system of FIG. 4A in a second mode of operation.

The throttle system 22 will now be explained, with reference to FIGS. 4A and 4B, wherein FIG. 4A shows the throttle system 22 in a first or "active" mode of operation, and FIG. 4B shows the throttle system 22 in a second or "idle" mode of operation. Generally, the throttle system 22 has a control cavity 97 defined therein which is used to direct the partially-heated air from the main engine system 12 to either the heat exchanger system 16 or to the rotary vane engine 24. As shown in FIG. 4A, the throttle system 22 includes a throttle control housing 96, which may be generally circular. A throttle control disc 98 is rotatably mounted within the throttle control housing 96. The throttle control cavity 97 is formed by a cutout in the throttle control disc 98 which is used to direct the flow of air from the throttle intake hose 94 to either the heat exchanger system 16 or to the rotary vane engine 24 depending upon the position of the throttle control disc 98. As shown, a throttle control member in the form of a throttle control lever 100 is coupled to the throttle control disc 98 for rotating of the throttle control disc 98. In FIG. 4A, the throttle control disc 98 is shown rotated to a first position, wherein the partially-heated air enters the throttle control cavity 97 and is directed to the heat exchanger system 16 via hose 102. In FIG. 4B, the throttle control disc 98 is shown rotated to a second position, wherein the partially-heated air enters the throttle control cavity 97 and is directed to the rotary vane engine 24. It can be appreciated that any suitable mechanical or electronic means may be used to effect rotation of the throttle control disc 98, and such means are not limited to the throttle control lever 100 in the embodiment shown. As shown in FIG. 4B, by rotating of the throttle control disc 98 (for example by using throttle control lever 100), the air may be directed into T-junction 104 and subsequently to hose 106, which leads to the rotary vane engine 24. It can be appreciated that the throttle system 22 may for example be used for a range of gradual positions between the first and second positions of the throttle control disc 98, and may not be limited to only the first and second positions described herein. In the embodiment shown, the first position may thus be considered as an active or full-powered state of the rotary vane engine system 10, while the second position may be considered as an idle state.

Figure 5:
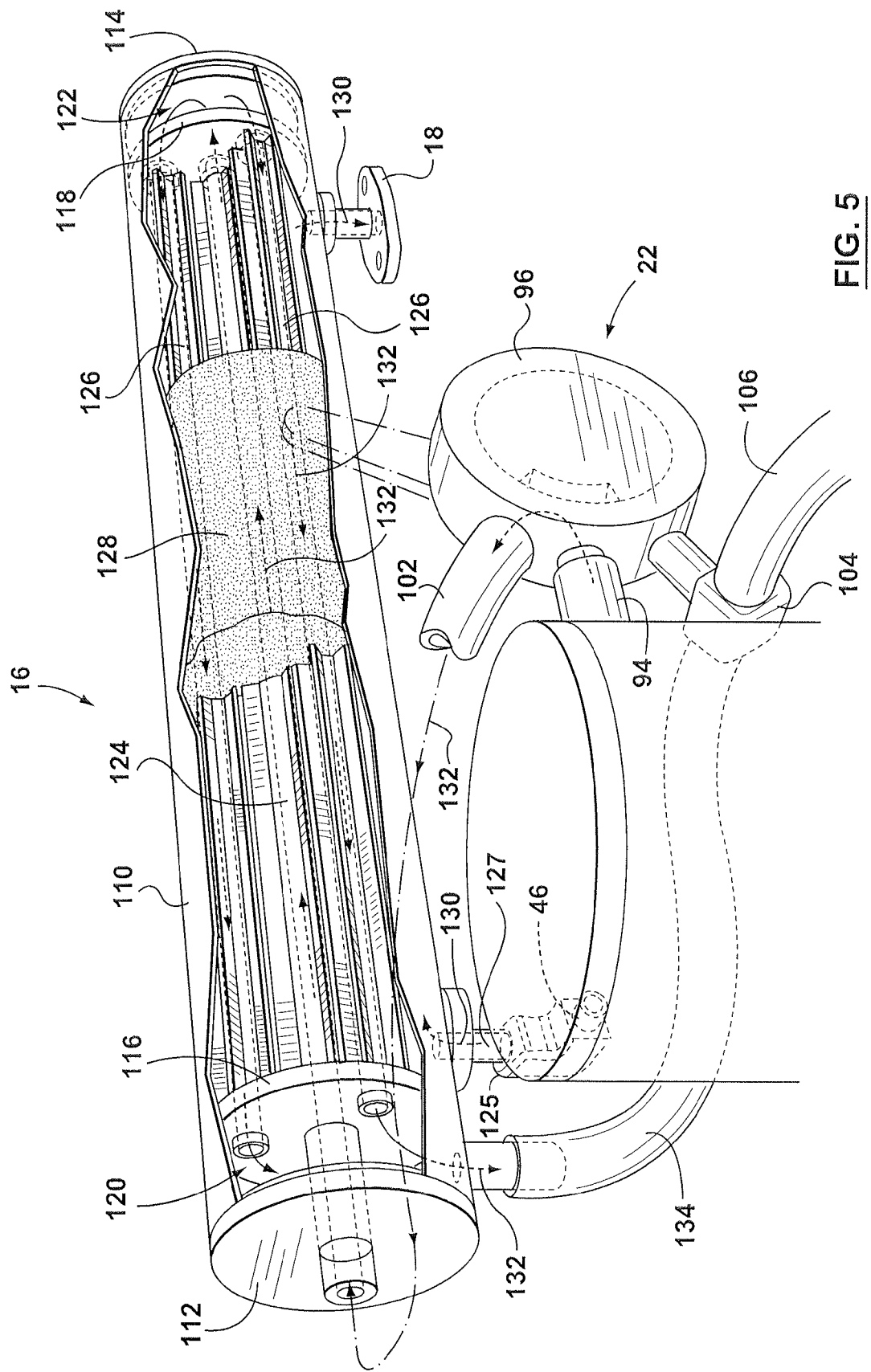
FIG. 5 shows a perspective, partially cutaway view of a heat exchanger system to be used in the rotary vane engine system of FIG. 1.

Reference is now made to FIG. 5, which shows a partially cutaway perspective view of the heat exchanger system 16. In the embodiment shown in FIG. 5, a longitudinal housing in the form of a heat exchanger tube 110 is used for housing of the heat exchanger system 16. The heat exchanger tube 110 may be formed of a suitably insulating material or materials to prevent heat from leaving the heat exchanger system 16. A front sealed end cap 112 and a rear sealed end cap 114 seal and cover the respective ends of the heat exchanger tube 110. A front baffle plate 116 and the front sealed end cap 112 define a front collector chamber 120. A rear baffle plate 118 and the rear sealed end cap 114 define a rear collector chamber 122. A primary finned heat exchanger tube 124 extends the length of the heat exchanger tube 110 from the front collector chamber 120 through to the rear collector chamber 122 and receives the partially-heated air from intake hose 102 (i.e., from throttle system 22). Secondary finned heat exchanger tubes 126 (three of which are shown, as best illustrated in FIG. 1) are positioned around the primary finned exchanger tube 124 and extend from rear collector chamber 122 to front collector chamber 122. Air contained in the rear collector chamber 122 passes back through the secondary finned heat exchanger tubes to the front collector chamber 120. Therefore, the heat exchanger system 16 is in effect, a double-pass heat exchanger. The finned shape of the primary and secondary heat exchanger tubes 124, 126 helps to promote the transfer of heat energy to the air contained therein.

The heat exchanger system 16 is used to transfer heat energy from the high temperature exhaust gases of the heat engine 14 to the partially-heated air received from the throttle system 22. An exhaust inlet elbow 125 permits exhaust gases from the heat engine 14 to enter the heat exchanger system 16 through an exhaust nipple 127. The exhaust gases flow interior of the heat exchanger tube 110 but exterior of primary and secondary finned heat exchanger tubes 124, 126. The exhaust outlet 18 permits exhaust gases to exit the heat exchanger system 16. The exhaust outlet 18 may also be coupled to suitable outlet mechanisms such as pipes, hoses, and the like, for exiting from the rotary vane engine system 10, as appropriate. A heat trap such as a wire mesh 128 is also shown surrounding the finned heat exchanger tubes 124, 126 in the interior of the heat exchanger tube 110. The wire mesh 128 is used for trapping and storing heat from the exhaust gases for subsequent transferring of heat to the filmed heat exchanger tubes 124, 126 and, at the same time, for permitting passage of exhaust gases through the heat exchanger tube 110 to the exhaust outlet 18. The wire mesh 128 may be formed of any suitable material for withstanding high temperatures and for resisting corrosion, oxidization, etc. One example material is tungsten, however any suitable material may be used. The flow path of the exhaust gases is represented by arrows 130 in FIG. 5 while the flow path of the closed air loop through the heat exchanger system 16 is represented by arrows 132. As can be appreciated, the now cooled exhaust gases exit at exhaust outlet 18. As described briefly above, the partially-heated air flowing through the primary finned heat exchanger tube 124 is further heated by way of heat exchange by the exhaust gases surrounding the primary finned heat exchanger tube 124. The partially-heated air from the throttle system 22 enters the heat exchanger system 16 and traverses through primary finned heat exchanger tube 124. This air is collected in rear collector chamber 122 and traverses through secondary finned heat exchanger tubes 126 for a second pass through the heat exchanger. This air is further heated by way of heat exchange by the exhaust gases surrounding the secondary finned heat exchanger tubes 126 and the heat trapped in the wire mesh 128 during the second pass. The air at this point may be considered to be high temperature and high pressure air. This high temperature and high pressure air then flows to the rotary vane engine 24 (FIG. 1) via exit hose 134.

Figure 7:
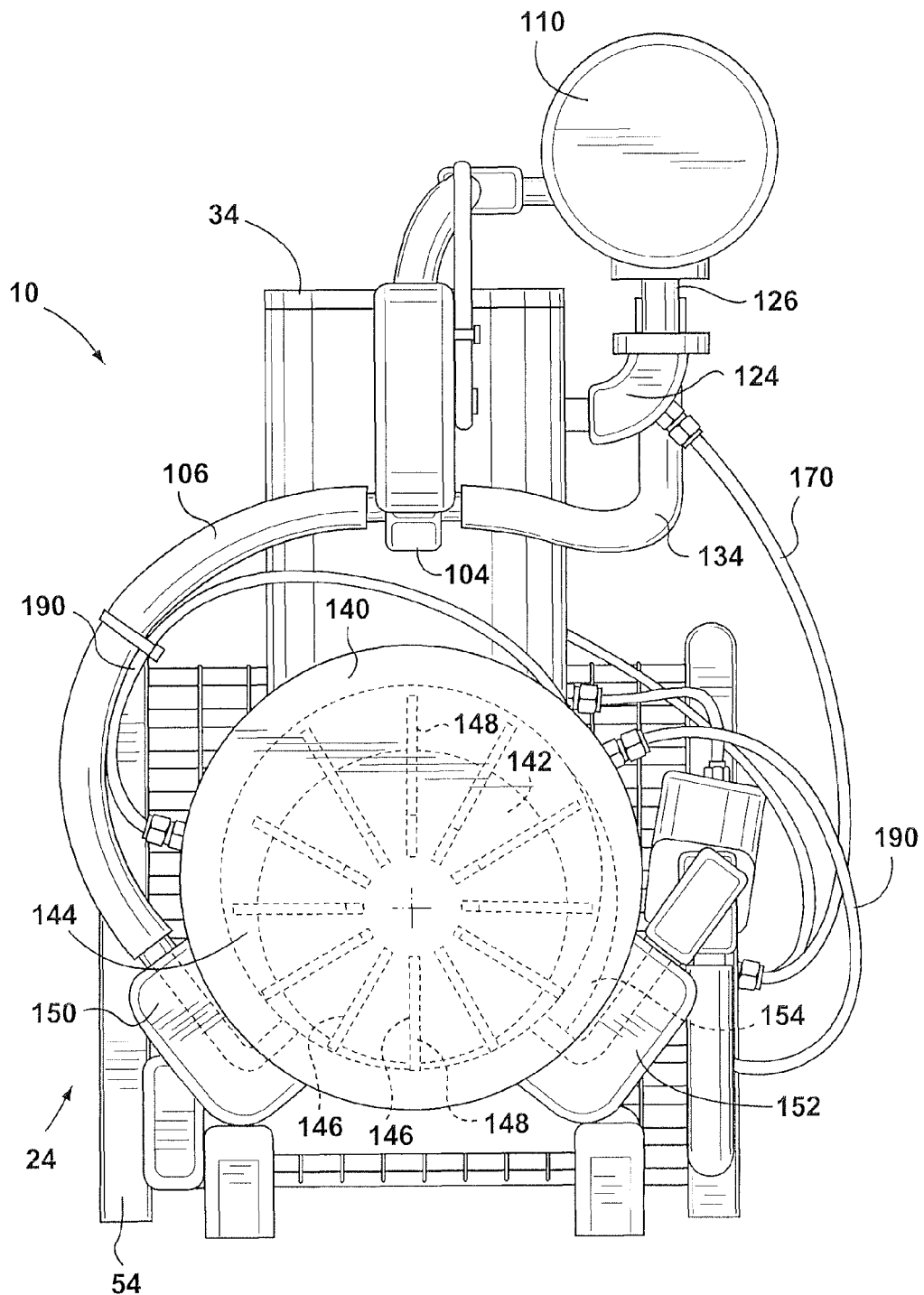
FIG. 7 shows a right side view of the rotary vane engine system of FIG. 1.

Reference is now made to FIG. 7, which shows the rotary vane engine 24. The rotary vane engine 24 includes a vane engine housing 140 having a generally circular cross-section. A rotor 142 is eccentrically mounted within the vane engine housing 140, for example on a lower portion or region of the vane engine housing 140 (as shown). A face plate 144 encloses the rotary vane engine 24 within the vane engine housing 140. The rotor 142 is coupled to the crankshaft 36 (FIG. 2) of the main heat engine 14 for providing additional driving force to the heat engine 14. The rotor 142 includes a number of spaced-apart slots 146 disposed at regular intervals around the circumference of the rotor 142. A plurality of reciprocating vanes 148 are also shown, one in each slot 146 of the rotor 142. Since the rotor 142 is eccentrically located in the lower portion of the vane engine housing 140, in operation, the vanes 148 on the lower portion retract radially inward, while the vanes 148 on an upper portion or region of the vane engine housing 140 extend radially outward. The volume of air contained between vanes 148 thus becomes larger in the upper portion and becomes gradually smaller in the lower portion, as shown. As can be appreciated, the appropriate placement of an inlet and outlet to the vane engine housing 140 may be used to facilitate the expansion of the high temperature and high pressure air, thereby driving the crankshaft 36 (FIG. 2) and providing additional power to the main heat engine 14 (FIG. 2). As shown, an input manifold 150 acts as the input to the vane engine housing 140, wherein the volume between the vanes 148 is relatively small. The high temperature and high pressure air expands as the rotor 142 rotates in a clockwise direction as viewed in FIG. 7, thus creating a driving force on the rotor 142 and the crankshaft 36 (FIG. 2). An outlet manifold 152 acts as the output of the vane engine housing 140, and leads to hose 56 (FIG. 6), which eventually returns the air to the compressor system 20 described above, thereby completing the closed loop. In addition, air channels 154 are defined in the vane engine housing 140 and are also coupled to outlet manifold 152. For example, three air channels 154 (as best shown in FIG. 1) can be formed within the vane engine housing 140. The air channels 154 may be used for relieving and venting of air to the outlet manifold 152 as the volume between the vanes 148 start to contract in operation.

Figure 8A:
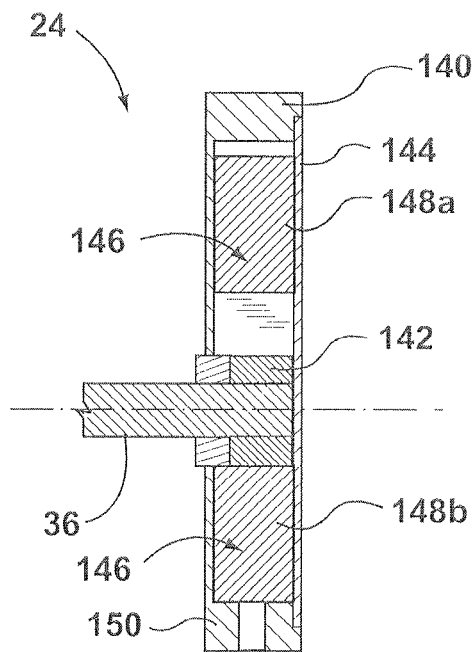
FIG. 8A shows a cross-sectional view of a rotary vane engine taken along section lines 8A-8A in FIG. 1.

Reference is now made to FIG. 8A, which shows a cross-section of the rotary vane engine 24 in greater detail. As shown, the vane 148b on the lower portion is forced radially inward by bearing against an inner surface of the vane engine housing 140. The vane 148a on the upper portion is urged radially outwards by centripetal force while in operation.

Having described the closed loop, additional features of the rotary vane engine system 10 will now be described.

Referring again to FIG. 6, an air pump 160 is coupled to an air filter 162, for drawing fresh air through the air filter 162. The term "fresh air" is used for convenience to distinguish from the air flowing within the closed loop. The air pump 160 may for example be operated by a gear 164 (FIG. 3), a drive belt 166 (FIG. 3) and another gear 168 (FIG. 2), which may be coupled to crankshaft 36 (FIG. 2). Injection line 170 receives the fresh air from the air pump 160. The fresh air is thereafter pumped into the exhaust inlet elbow 125, where the fresh air is used for facilitating combustion within the heat engine 14.

The rotary vane engine system 10 may further include an oil pump system 180 for lubricating of the moving parts contained within the components forming the closed loop of the rotary vane engine system 10. Generally, oil from the oil pump system is pooled and collected at the bottom of the pressure chamber 90 (FIG. 2). An oil return line 182 collects the oil from the pressure chamber 90 (FIG. 2). An oil filter 184 may be used to receive and filter the oil from oil return line 182. The oil may for example be fed through gravity. A multi-port oil pump 186 may be used to pump oil to various parts of the closed loop. As shown, the multi-port oil pump 186 may be coupled to the same controlling mechanism as in the air pump 160. As described above, the gear 164 is driven by drive belt 166 (FIG. 3), and the drive belt 166 (FIG. 3) is couple to another gear 168 (FIG. 2) mounted onto the crankshaft 36 (FIG. 2). It will be understood that the multi-port oil pump 186 may instead be independently driven and does not necessarily need to be coupled to the main engine system 12 (FIG. 2). The multi-port oil pump 186 injects oil via lubrication lines to appropriate locations within the closed loop. As shown, lubrication lines 190 provide oil lubrication to the rotary vane engine 24. Similarly, lubrication line 188 provides oil into the compressor housing 72 in the compressor system 20. Other lubrication lines may be present, as appropriate. When the system 10 is in operation, because of the velocity of the air circulating within the closed loop, the majority of oil would remain air suspended, with only a small percentage pooling in the oil reservoir inside the pressure chamber 90. The oil is then recycled through the oil filter 184, and this cycle repeats.

The operation of the system 10 will now be described. In a cold or non-running state, the closed loop is pressurized with air that is compressed above atmospheric pressure. In some example embodiments, the air pressure during the cold or non-running state may range from 150 pounds per square inch (psi) to as much as 1000 psi. A compressor (not shown) such as a needle compressor may be used to periodically maintain the pressure in the closed loop, for example when the system 10 is not running, or may be calibrated during regular maintenance schedules, etc. The needle compressor (not shown) may also for example be operable by way of a switch (not shown), which may for example be activated when gauge levels of the closed loop are below a predetermined threshold.

Referring now to FIG. 2, the operation of the system 10 begins with the ignition of the heat engine 14 in the main engine system 12. Fuel is combusted in a combustion cycle within the region between the piston 40 and the finned cylinder 42. As described, the connecting rod 38 coupled to the piston 40 also moves, causing crankshaft 36 to turn. Exhaust gases exit valves (not shown) contained in valve cover 44 and exit finned cylinder 42 via exhaust exit pipe 46 (FIG. 5).

Referring to FIG. 3, in the cooling component 50 of the compressor system 20, the pressurized air traverses from the inlet manifold 58 to the outlet manifold 60 through the heat exchanger 54 and is cooled by the cooling fan 64 (FIG. 2). Therefore, the pressurized air in the heat exchanger 54 becomes cooled air and exits the outlet manifold 60 via exit hose 66 (FIG. 2).

Referring still to FIG. 3, the compressor component 52 of the compressor system 20 receives the cooled air from the cooling component 50. The cooled air travels to the compressor intake manifold 82 and enters the compressor housing 72. The rotor 74 rotates in a counterclockwise direction, as viewed in FIG. 3, being driven by the crankshaft 36 (FIG. 2). The cooled air becomes trapped in a space defined between two of the vanes 80. As the rotor 74 rotates, the volume between the two vanes 80 decreases, thereby further compressing the air. At this point, the air may be considered cooled and compressed air. The cooled and compressed air exits at the compressor outlet manifold 84 via compressor hose 85.

Referring now to FIG. 2, the cooled and compressed air from the compressor system 20 enters the main engine system 12. The cooled and compressed air enters through input elbow 92 and into pressure chamber 90. The cooled and compressed air circulates around the exterior of finned cylinder 42 and valve cover 44. By doing so, the air cools the heat engine 14 thereby gaining heat. As a result, the cooled and compressed air becomes partially-heated air. The partially-heated air exits the pressure chamber 90 via the throttle intake hose 94.

When the throttle system 22 is in an active or full-powered state, the throttle control disc 98 is in its first position (see FIG. 4A), and the partially-heated air from throttle intake hose 94 is directed through throttle control cavity 97 to hose 102 where it is fed into the heat exchanger system 16 (FIG. 1).

Referring again to FIG. 5, the partially-heated air enters the heat exchanger system 16 through hose 102 and travels through the primary finned heat exchanger tube 124. At the same time, the high temperature exhaust gases exit the heat engine 14 through exhaust pipe 46 and are fed into the interior of the heat exchanger tube 110, remaining exterior to the primary and secondary heat exchanger tubes 124, 126. The exhaust gases pass through the wire mesh 128 and the heat from the exhaust gases is trapped within the wire mesh 128. As the partially-heated air travels longitudinally through the primary finned heat exchanger tube 124 and doubles-back through secondary heat exchanger tubes 126 (see air flow path 132), the air gains heat through heat transfer between the exhaust gases and the heat stored in the wire mesh 128. Once the air has completed the double-pass through the heat exchanger tube 110, the air travels to the front collector chamber 120, and subsequently exits the heat exchanger tube 110 via exit hose 134. At this point, the air may be considered high temperature and high pressure air. In other words, the high temperature and high pressure air may be considered "highly charged", for driving of the rotary vane engine 24 (FIG. 1).

The highly charged air travels through hose 134 to T-junction 104 and hose 106 for input into the input manifold 150 of the rotary vane engine 24. Since the rotor 142 is coupled to the crankshaft 36 (FIG. 2), the rotor 142 is already rotating in a clockwise direction, when viewing FIG. 7. The highly charged air enters the rotary vane engine 24, the air becomes trapped in the space defined between two of the vanes 148. The trapped highly charged air expands and causes the vanes 148 and rotor 142 to rotate, thus providing an additional driving force to the crankshaft 36 (FIG. 2). Accordingly, some of the heat energy captured from the exhaust gases, which may have otherwise been wasted, is re-used in the rotary vane engine system 10 described herein. To complete the cycle, the now "spent" air from the rotary vane engine 24 exits the outlet manifold 152 and is cycled back to the cooling component 50 of the compressor system 20 through hose 56; therefore, the cycle of the closed loop repeats.

The idle state of the system 10 will now be described. When the throttle system 22 is in the second or idle position (see FIG. 4B) the partially-heated air exiting the pressure chamber 90 is directed from the throttle intake hose 94 to T-junction 104 and subsequently to hose 106 to the rotary vane engine 24 (FIG. 1) by-passing the heat exchanger system 16. In the idle state, since the partially-heated air is not "highly charged", i.e., not high temperature and high pressure, the partially-heated air is merely circulated through the vanes 148 of the rotary vane engine 24, rather than acting as the driving force to the rotary vane engine 24. Although the partially-heated air does not flow through the heat exchanger system 16, it will be understood that the exhaust gases which exit the heat engine 14 still pass through the heat exchanger system 16, as described above, with the heat from the exhaust gases remaining trapped in the wire mesh 128 for use when the system 10 is returned to the active state.

Figure 8B:
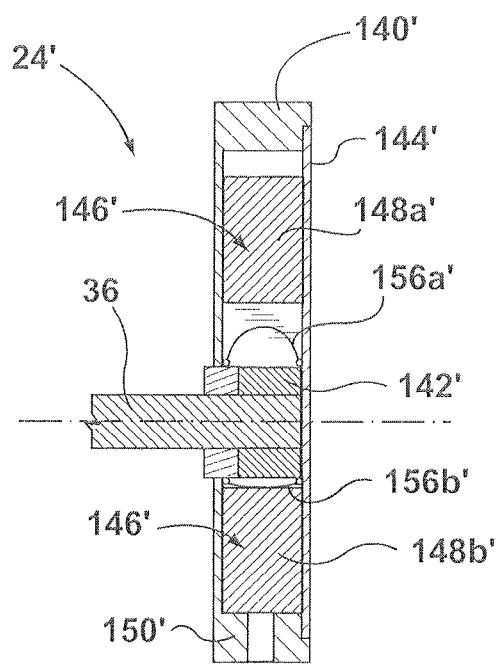
FIG. 8B shows a cross-sectional view of another example embodiment of a rotary vane engine, similar to the view taken along section lines 8A-8A in FIG. 1.

Alternative embodiments will now be described. Reference is now made to FIG. 8B, which shows a cross-section of another example embodiment of a rotary vane engine 24', which may for example be used in the rotary vane engine system 10, described above. In the embodiment shown, spring members 156' are used to assist in the operation of this rotary vane engine 24'. As shown, a rotor 142' is eccentrically located within a vane engine housing 140' which includes faceplate 144'. Air enters through input manifold 150' and exits through output manifold (not shown). Vanes 148' are located within slots 146' defined in the rotor 142'. Spring members 156' are also located within each slot 146' in the rotor 142'. As shown, spring member 156b' is compressed when vane 148b' is forced radially inward by bearing against an inner surface of the vane engine housing 140'. The vane 148' thereafter extends radially outwards by centripetal force upon rotation of the rotor 142'. Simultaneously, the spring member 156' (for example, 156a' as shown) also extends by restitution and assists in ejecting the vane 148a' from the slot 146' in the rotor 142'. The cycle is then repeated.

Another example embodiment of a rotary vane engine system will now be explained with reference to FIGS. 9 to 11. Generally, this rotary vane engine 200 provides for gear shifting, by permitting the "highly charged" air from the heat exchanger system 16 to pass through one, two, or three rotary vane chambers, as appropriate. For example, drive requirements may fluctuate over a broad range depending on the particular application, such as acceleration or deceleration of a vehicle. Reference is now made to FIG. 10, which shows a cross-sectional view (i.e., similar to the cross-sectional view of FIG. 8A) of the rotary vane engine 200. As shown, the rotary vane engine 200 has a vane engine housing 202 wherein there is defined three equal and individually sealed vane engine chambers 204a-c. Each vane engine chamber 204a-c contains a rotor 206a-c, which may be eccentrically mounted within the housing 202. Each rotor 206a-c includes a plurality of spaced apart slots 208a-c, and a plurality of vanes 210a-c extending radially from each rotor 206a-c, one in each slot 208a-c. The vanes 210a-c may for example be reciprocating vanes, as previously described. Each rotor 206a-c is also coupled to a main crankshaft 212 of a heat engine (similar to the crankshaft 36 of heat engine 14, as described above). An inlet manifold 214 is also shown, defining three air passages (as shown) to each rotary vane chamber 204. The rotary vane chambers 204a-c are separated and sealed from each other via partition sidewalls 260, as shown.

Reference is now made to FIG. 9, which shows a partial front elevation view of the rotary vane engine 200. A hose 216 leads to the input manifold 214, wherein the hose 216 contains "highly charged" air (as previously described). As shown, the air passage defined in input manifold 214 splits into three separate air passages, one for each chamber 204a-c. Also shown are two switches 218a, 218b located at entry ports to chambers 204a, 204b, respectively. A pressure sensor 220 is also located within the input manifold 214 for determining of air pressure entering the rotary vane engine 200. The pressure sensor 220 is electrically coupled to the switches 218a, 218b. The switches 218a, 218b may for example be an electrically actuated spool valve or other type of valve, which may for example have a sliding spool. Upon applying a suitable current, the switches 218a, 218b actuate the spool and thereby permit air to flow, representing an open state. When no current is applied (or a reverse current, as applicable), the spool retracts and once again blocks air from flowing through the switch 218.

Reference is now made to FIG. 11, which shows a front side view of a gear shift system 230 to be used with the rotary vane engine 200. The gear shift system is used to control the air entering the rotary vane chambers 204a-c, so as to either add or remove drive to the crankshaft 212, as appropriate. The gear shift system 230 may also be used to control the gear-shifting operation of a conventional vehicle having a heat engine (for example heat engine 14, previously described). As shown, a cam disc 232 having a pointer 234 is controlled by a handle 236, for operation by a user, for example a driver of a vehicle. The pointer 234 of the cam disc 232 points to a number of drive setting indicators 238. As shown, example drive setting indicators 238 include park ("P"), Reverse ("R"), Neutral ("N"), Drive ("D"), Second Gear ("2nd") and First Gear ("1st"). Drive ("D") represents an automatic mode of operation, while Second Gear ("2nd") and First Gear ("1st") represent manual modes of operation. Two leads 240, 242 may, for example, be used to detect when the gear shift system 230 is in the First Gear and Second Gear, respectively. When cam disc 232 rotates, contacts 244, 246 come into contact with the leads 240, 242 in order to complete a circuit loop, for example by providing a ground, as shown. Lead wires 248, 250 extend from leads 240, 242, respectively. The lead wires 248, 250 may, for example, lead to the switches 218, 218 (FIG. 9), for electrical coupling and operation of the switches 218, 218.

The operation of the rotary vane engine 200 will now be described, with reference to FIG. 9. An automatic mode of operation may, for example, operate when a vehicle is accelerating. A Third Gear mode is first explained. In an initial cold-running state, both switches 218a, 218b are closed (i.e. unactivated), thereby blocking chambers 204a and 204b, and allowing air only into rotary vane chamber 204c. When the heat engine coupled to the crankshaft 212 is started, relatively low pressure low temperature air enters into hose 216 and input manifold 214, and into rotary vane chamber 204c. The smaller relative volume of rotary vane chamber 204c allows the vane engine 200 to produce some useful drive to the crankshaft 212 when in the warm-up stage. The air travelling through rotary vane chamber 204c represents high gear or Third Gear, which for example represents low drive (i.e. torque) and high revolutions per minute (RPM) potential.

The Second Gear will now be explained. As the air warms (for example from a heat exchanger system 16, as previously described), the pressure sensor 220 senses a pressure increase within input manifold 214. At a predetermined pressure detected by pressure sensor 220, the pressure sensor 220 activates switch 218b and causes switch 218b to open, thereby allowing air to enter rotary vane chamber 204b. The combined drive from rotary vane chambers 204b and 204c represent the Second Gear, increasing the drive (i.e., torque) to the crankshaft 212.

The First Gear will now be explained. While still in operation, the air entering input manifold 214 may further increase in pressure and temperature. When pressure sensor 220 detects an even greater predetermined pressure, it activates switch 218a, causing switch 218a to open, allowing air to enter rotary vane chamber 204a. With chambers 204a-c all open and supplying drive to the crankshaft 212, the vane engine 200 is supplying maximum drive to the crankshaft 212. This represents low, or First Gear.

As the pressure decreases, for example when a vehicle decelerates, pressure sensor 220 detects a lowering of the pressure and causes switch 218a to close, shifting the rotary vane engine 200 back to Second Gear. As the pressure further decreases, pressure sensor 220 detects a lowering of the pressure and causes switch 218b to close, shifting the rotary vane engine 200 back to Third Gear.

It can be appreciated that the First Gear and Second Gear may be manually operated by operating gear shift 150 such that the pointer 234 is pointing to the appropriate drive setting indicator 238.

Although three equal-sized rotary vane chambers 204a-c has been described, it can be appreciated that the size and/or volume of the vane chambers 204a-c may be varied, as appropriate, depending on the application. In addition, more or less than three rotary vane chambers 204 may be used, as appropriate.

Referring now to FIG. 1, in some example embodiments, the system 10 may be constructed as a stand-alone unit. In other example embodiments, existing heat engines and/or vehicles may be modified to have at least some of the functionality of the system 10 as described above.

Although the example embodiments described above have used air as the circulating medium in the closed loop, it can be appreciated that any suitable substance may be used, for example liquids and gases in an appropriate case.

It will also be understood that references to temperature and pressure have been used as convenient terms and are to be interpreted in a relative sense to the system 10. For example, "cooled air" may be at a lower temperature with respect to the system 10, but not with necessarily respect to the surrounding environment.

It can also be appreciated that different variants of rotary vane engines may be used as appropriate, for example conventional turbines. Other examples include using gear pumps and displacement pumps as the rotary vane engine.

While the invention has been described in detail in the foregoing specification, it will be understood by those skilled in the art that variations may be made without departing from the scope of the invention, being limited only by the appended claims.

What is claimed is:

1. A method of using exhaust heat energy of a fuel-based heat engine, the heat engine including a crankshaft being driven by a combustion cycle, the heat engine generating exhaust gases by combustion, the method comprising:
   providing an independent air system configured in a closed loop, wherein the independent air system contains an air stream separate to the exhaust gases, and wherein air contained in the independent air system is maintained at a pressure above atmospheric pressure prior to starting of the heat engine;
   bringing the air stream of the independent air system into thermal contact with the exhaust gases, thereby transferring heat energy from the exhaust gases to the air stream in the independent air system to generate a pressurized air stream;
   providing a rotary vane engine in communication with the independent air system, the rotary vane engine having a housing, a rotor contained within the housing and coupled to the crankshaft of the heat engine and a plurality of vanes extending radially from the rotor;
   expanding the pressurized air stream within the rotary vane engine to effect a rotation of the rotor; and
   driving the crankshaft of the heat engine by the rotation of the rotor.

2. A rotary vane engine system for using exhaust heat energy of a fuel-based heat engine, the heat engine including a crankshaft being driven by a combustion cycle, the heat engine generating exhaust gases by combustion, the system comprising:
   an independent air system configured in a closed loop, wherein the independent air system contains air separate to the exhaust gases, wherein air contained in the independent air system is maintained at a pressure above atmospheric pressure prior to starting of the heat engine;
   a heat exchanger system for transferring exhaust heat energy from the exhaust gases to the air contained in the independent air system to generate pressurized air; and
   a rotary vane engine having a housing, a rotor contained within the housing and coupled to the crankshaft of the heat engine, and a plurality of vanes extending radially from the rotor,
   wherein the pressurized air is expanded within the rotary vane engine for rotation of the rotor thereby providing drive to the crankshaft of the heat engine.

3. The rotary vane engine system of claim 2, wherein the plurality of vanes in the rotary vane engine are reciprocating vanes.

4. The rotary vane engine system of claim 2, wherein the rotor in the rotary vane engine is eccentrically mounted within the housing, the rotor containing a plurality of spaced apart slots disposed around a circumference of the rotor, each slot containing one of the plurality of vanes, the vanes being slideable within each slot, the vanes radially extending in a first region of the rotary vane engine upon rotation of the rotor to increase air volume between adjacent vanes, and radially retracting in a second region of the rotary vane engine thereby decreasing air volume between adjacent vanes.

5. The rotary vane engine system of claim 4, further comprising air channels defined in the housing of the rotary vane engine, the air channels being located proximate to said second region where the vanes radially retract, the air channels being coupled to an outlet manifold for expelling air from said housing to the outlet manifold.

6. The rotary vane engine system of claim 2, wherein the rotary vane engine includes a plurality of vane engine chambers defined in the housing, each chamber containing one of a plurality of further rotors, the plurality of further rotors being coupled to the crankshaft of the heat engine, and each of the plurality of further rotors having a plurality of further vanes radially extending from each the plurality of further rotors, and a switch located at at least one vane engine chamber for allowing or blocking air from entering into the at least one vane engine chamber.

7. The rotary vane engine system of claim 6, further comprising a pressure sensor for determining air pressure within the independent air system, wherein the pressure sensor activates the switch upon the pressure reaching a predetermined air pressure.

8. The rotary vane engine system of claim 2, wherein the heat exchanger system includes a longitudinal housing for passage therein of exhaust gases, an exhaust inlet positioned at an end of the longitudinal housing for receiving of exhaust gases, an exhaust outlet positioned at an opposing end of the longitudinal housing for exiting of exhaust gases, a finned heat exchanger tube coupled to the independent air system and located within the longitudinal housing for interior passage therein of air from the independent air system and for maintaining the exhaust gases exterior of the finned heat exchanger tube, thereby permitting thermal contact and transfer of exhaust heat energy from the exhaust gases exterior of the finned heat exchanger tube to the air passing within the finned heat exchanger tube.

9. The rotary vane engine system of claim 2, wherein the heat exchanger system includes a heat trap for trapping of exhaust heat energy from the exhaust gases while permitting passage of exhaust gases therethrough to the exhaust outlet.

10. The rotary vane engine system of claim 9, wherein the heat trap is formed of wire mesh.

11. The rotary vane engine system of claim 10, wherein the wire mesh is formed of tungsten.

12. The rotary vane engine system of claim 2, further comprising a heat engine chamber for housing of the heat engine, the heat engine chamber receiving air from the independent air system for cooling of and gaining heat from the heat engine.

13. The rotary vane engine system of claim 2, further comprising a compressor system for compressing of air in the independent air system.

14. The rotary vane engine system of claim 13, wherein the compressor system compresses air exiting from an outlet manifold of the rotary vane engine.

15. The rotary vane engine system of claim 13, wherein the compressor system includes a vane compressor.

16. The rotary vane engine system of claim 13, wherein the compressor system includes a cooling component having a plurality of tubes coupled to the independent air system for the flow of air from the independent air system, and a fan for circulating cool, atmospheric air across the plurality of tubes, for cooling of the air traversing therethrough.

17. The rotary vane engine system of claim 2, further comprising a throttle system having a throttle housing, an operable throttle control member contained within the throttle housing and having a cavity defined therein, the throttle control member acting as a directing mechanism for directing air received from the independent air system into the cavity for passage to either the heat exchanger system or to the rotary vane engine.

18. The rotary vane engine system of claim 2, further comprising an oil pump system having an oil pump, an oil filter for filtering oil to the oil pump, and injection lines coupled from the oil pump to predetermined components of the independent air system, for delivering of lubricating oil to the independent air system.

19. The rotary vane engine system of claim 2, wherein said air contained in the independent air system is maintained at a pressure of at least 150 pounds per square inch.

20. The rotary vane engine system of claim 2, wherein the rotor is directly coupled to the crankshaft of the heat engine so that the crankshaft of the heat engine is a common crankshaft.

* * * * *